(12) United States Patent
Kolze et al.

(10) Patent No.: US 9,077,576 B2
(45) Date of Patent: *Jul. 7, 2015

(54) ORTHOGONAL FREQUENCY DIVISION MULTIPLEXING (OFDM) WITH VARIABLE BIT LOADING AND TIME AND/OR FREQUENCY INTERLEAVING

(71) Applicant: BROADCOM CORPORATION, Irvine, CA (US)

(72) Inventors: Thomas J. Kolze, Phoenix, AZ (US); Tak K. Lee, Irvine, CA (US); Ba-Zhong Shen, Irvine, CA (US); Richard S. Prodan, Niwot, CO (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/099,619

(22) Filed: Dec. 6, 2013

(65) Prior Publication Data

US 2014/0169425 A1    Jun. 19, 2014

Related U.S. Application Data

(60) Provisional application No. 61/737,710, filed on Dec. 14, 2012, provisional application No. 61/738,382, filed on Dec. 17, 2012, provisional application No. 61/767,738, filed on Feb. 21, 2013, provisional application No. 61/910,335, filed on Nov. 30, 2013, provisional application No. 61/910,334, filed on Nov. 30, 2013.

(51) Int. Cl.
    H04L 27/28    (2006.01)
    H04L 25/03    (2006.01)
    (Continued)

(52) U.S. Cl.
    CPC ........ *H04L 25/03343* (2013.01); *H04L 5/0044* (2013.01); *H04L 5/0007* (2013.01); *H04L 27/2627* (2013.01); *H04L 1/0003* (2013.01)

(58) Field of Classification Search
    CPC . H04L 1/0071; H04L 27/2601; H04L 5/0007; H04L 1/0612; H04L 27/2627
    USPC .................................................. 375/260, 295
    See application file for complete search history.

(56) References Cited

U.S. PATENT DOCUMENTS 6,956,872 B1 * 10/2005 Djokovic et al. ............. 370/505
7,050,419 B2 *  5/2006 Azenkot et al. ............... 370/347

(Continued)

OTHER PUBLICATIONS

European Patent Office; European Search Report; EP Application No. 13005795.3; Mar. 3, 2015; 3 pgs.

(Continued)

*Primary Examiner* — Emmanuel Bayard
(74) *Attorney, Agent, or Firm* — Garlick & Markison; Shayne X. Short

(57) ABSTRACT

A communication device is configured to perform processing of one or more bits to generate a modulation symbol sequence based on one or more profiles that specify variable bit loading of bits per symbol over at least some of the modulation symbols of the modulation symbol sequence. The communication device is also configured to perform interleaving of the modulation symbol sequence to generate OFDM symbol(s). Some modulation symbols within the modulation symbol sequence that are separated by an interleaver depth may be transmitted via adjacently located sub-carriers, while other modulation symbols within the modulation sequence that are separated by more than the interleaver depth may also be transmitted via adjacently located sub-carriers. A communication device may be configured to adapt and switch between different operational parameters used for bit loading, interleaving and/or deinterleaving at different times based on any desired considerations.

20 Claims, 10 Drawing Sheets

(51) Int. Cl.
*H04L 5/00* (2006.01)
*H04L 27/26* (2006.01)
*H04L 1/00* (2006.01)

(56) References Cited

U.S. PATENT DOCUMENTS

| | | |
|---|---|---|
| 7,693,234 B2 | 4/2010 | Aldana |
| 2005/0157682 A1 | 7/2005 | Sandhu |
| 2006/0062289 A1 | 3/2006 | Hiermath et al. |
| 2007/0258529 A1* | 11/2007 | Liang et al. .................. 375/260 |
| 2009/0257454 A1 | 10/2009 | Maltsev et al. |
| 2011/0310988 A1* | 12/2011 | Schedelbeck et al. ........ 375/259 |
| 2012/0063429 A1* | 3/2012 | Yang et al. .................... 370/338 |
| 2012/0134433 A1* | 5/2012 | Haas et al. .................... 375/262 |

OTHER PUBLICATIONS

Song et al.; Adaptive modulation and coding (AMC) for bit-interleaved coded OFDM (BIC-OFDM); 2004 IEEE International Conference on Communications; Jun. 20-24, 2004; pp. 3197-3201; vol. 6.

* cited by examiner

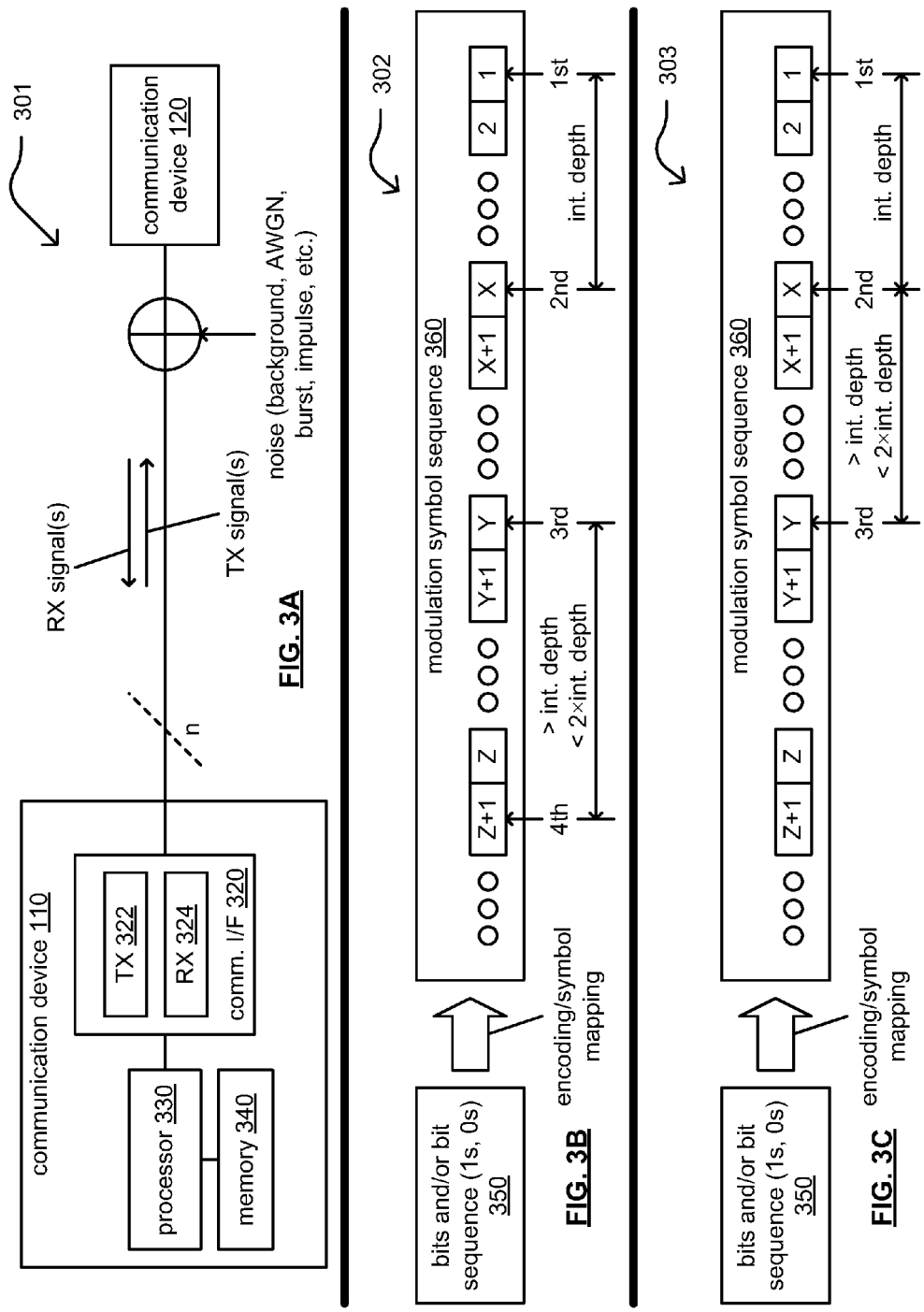

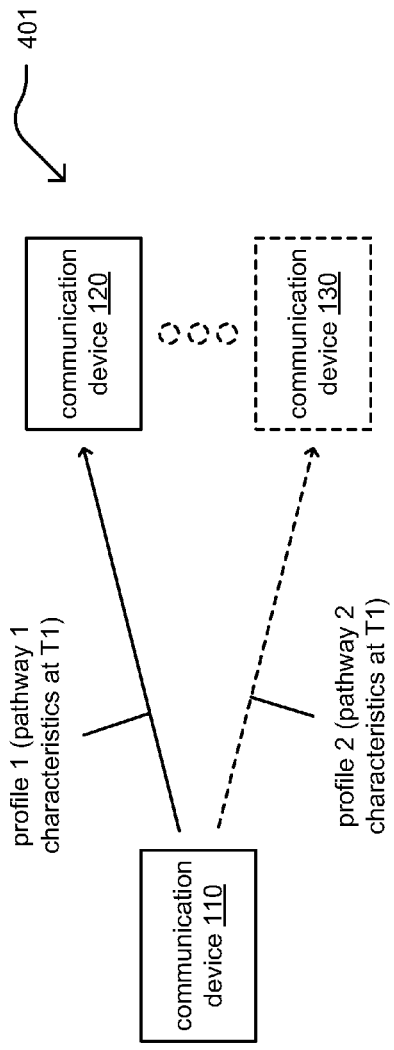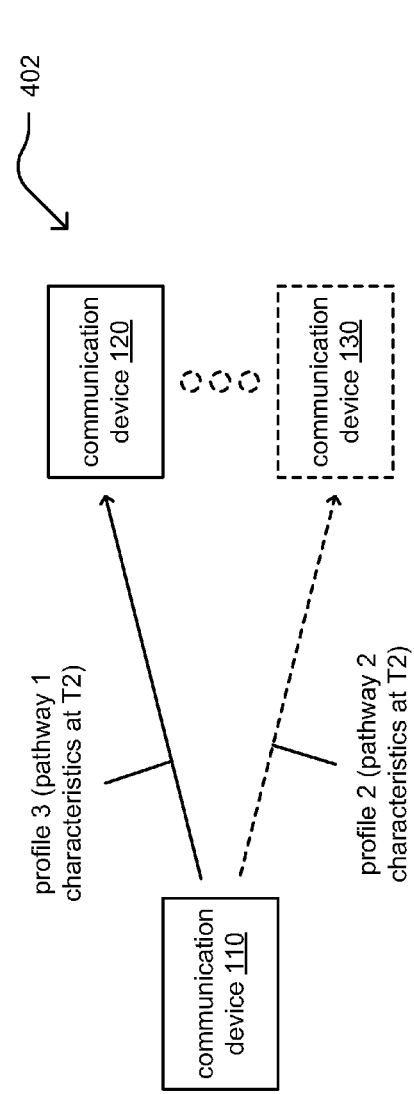

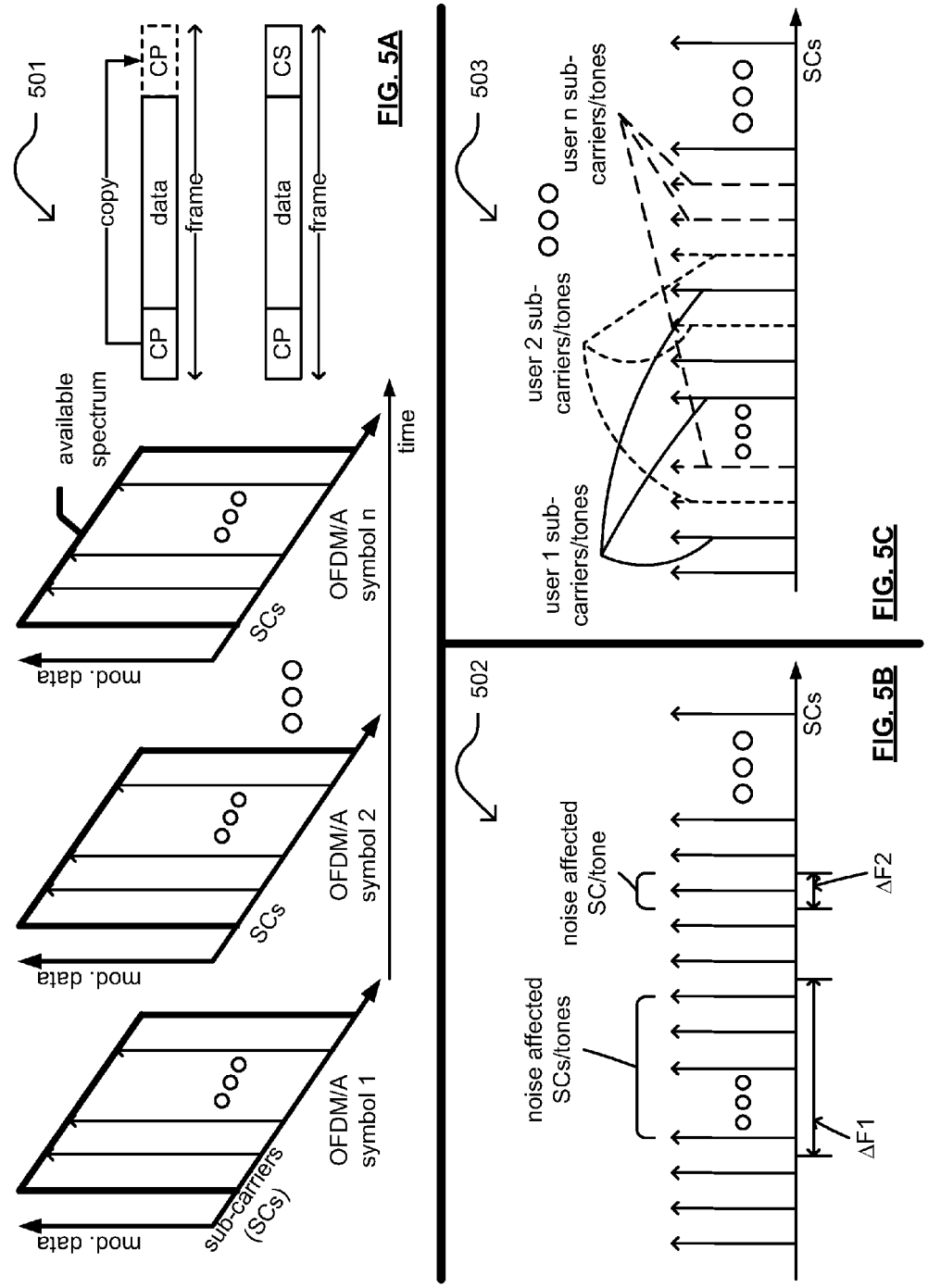

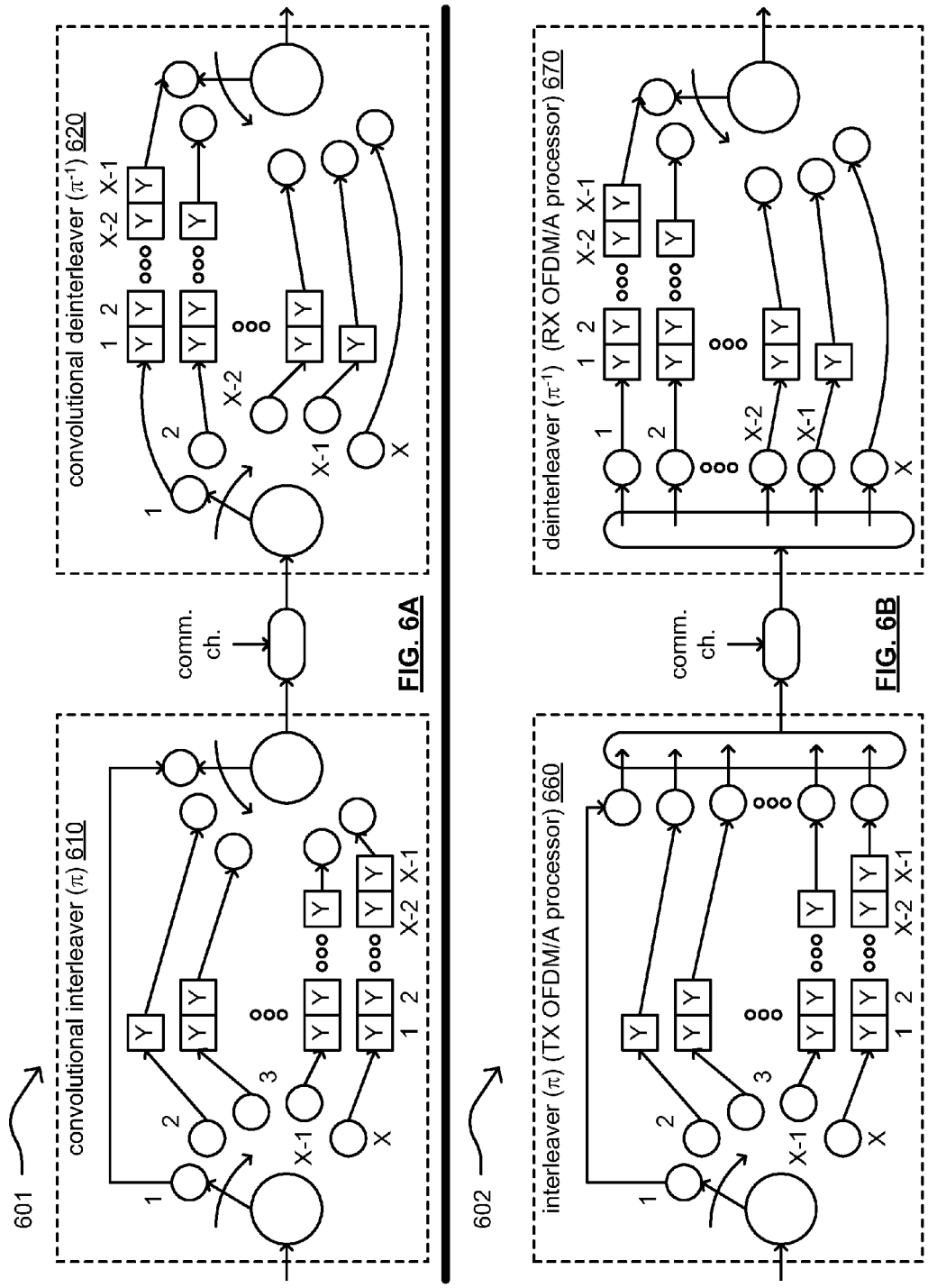

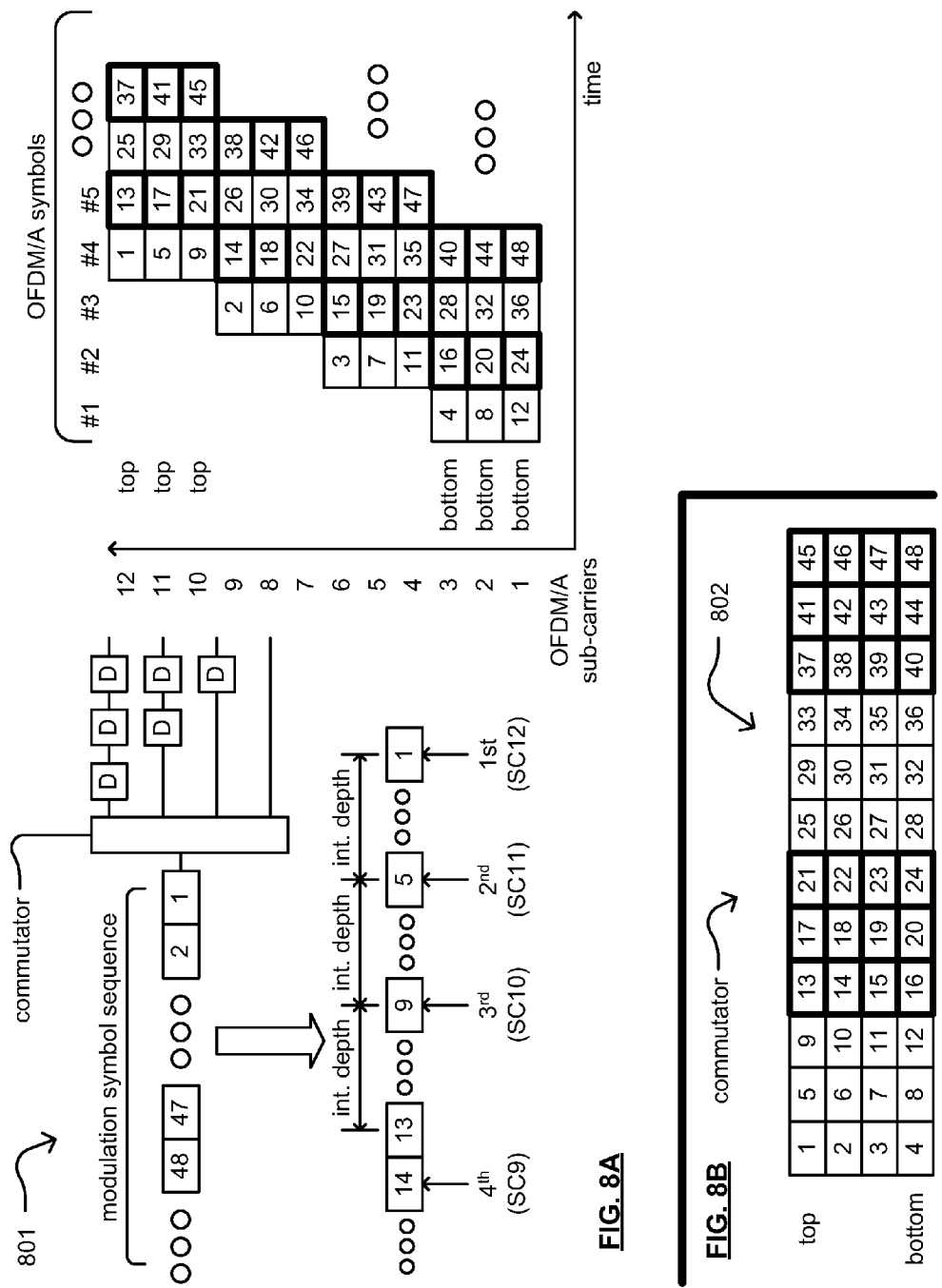

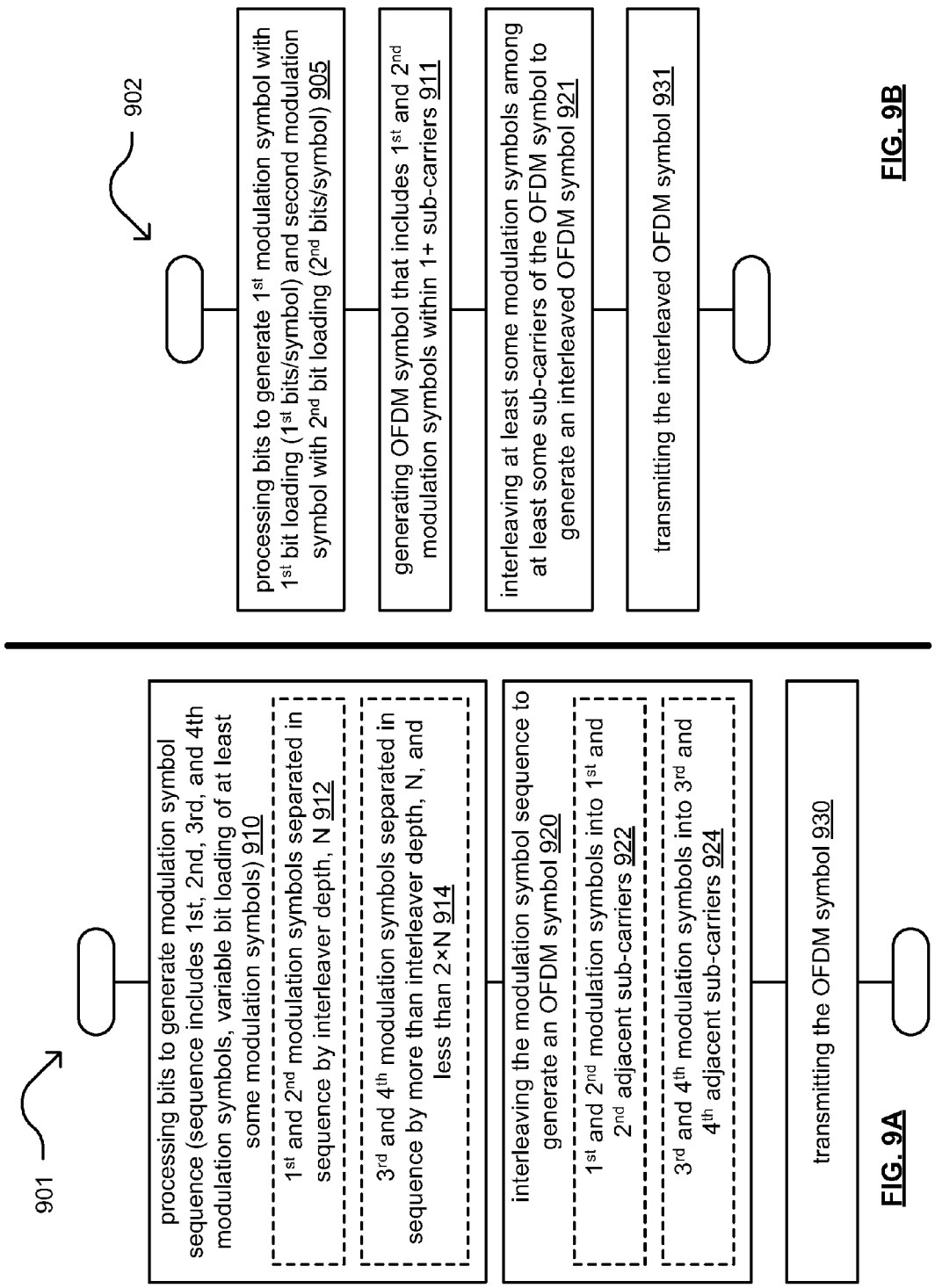

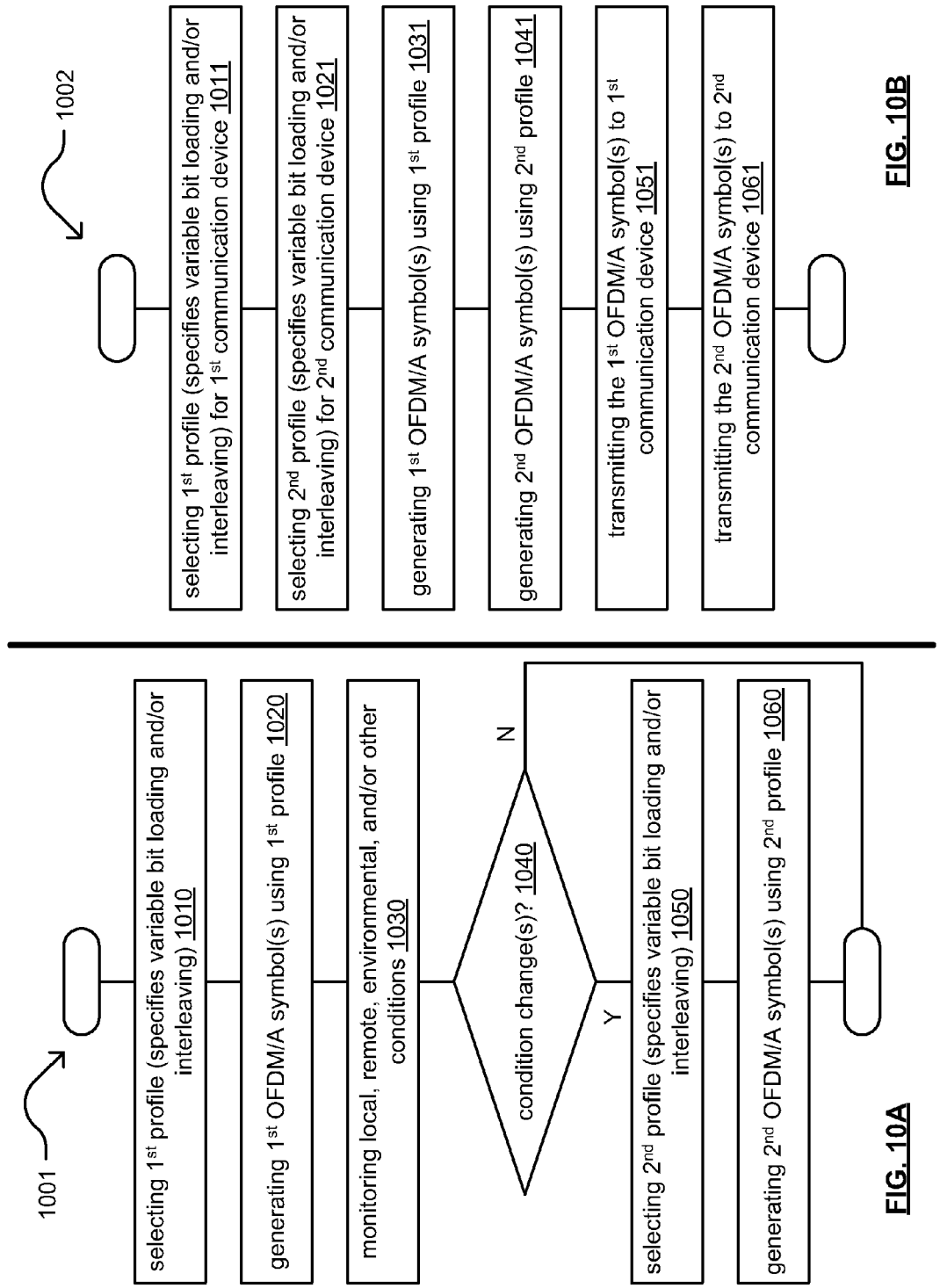

ORTHOGONAL FREQUENCY DIVISION MULTIPLEXING (OFDM) WITH VARIABLE BIT LOADING AND TIME AND/OR FREQUENCY INTERLEAVING

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent App. Ser. No. 61/737,710, entitled "Interleaving with orthogonal frequency division multiplexing (OFDM)," filed Dec. 14, 2012.

2. U.S. Provisional Patent App. Ser. No. 61/738,382, entitled "Variable bit loading," filed Dec. 17, 2012.

3. U.S. Provisional Patent App. Ser. No. 61/767,738, entitled "Systematic/random time-frequency interleaving for orthogonal frequency division multiplexing (OFDM) modulation," filed Feb. 21, 2013.

4. U.S. Provisional Patent App. Ser. No. 61/910,335, entitled "Orthogonal frequency division multiplexing (OFDM) interleaving," filed Nov. 30, 2013.

5. U.S. Provisional Patent App. Ser. No. 61/910,334, entitled "Orthogonal frequency division multiplexing (OFDM) with variable bit loading and time and/or frequency interleaving," filed Nov. 30, 2013.

BACKGROUND

1. Technical Field

The present disclosure relates generally to communication systems; and, more particularly, to variable bit loading and interleaving of signals to be communicated within such communication systems.

2. Description of Related Art

Data communication systems have been under continual development for many years. The primary goal within such communication systems is to transmit information successfully between devices. Unfortunately, many things can deleteriously affect signals transmitted within such systems resulting in degradation of or even complete failure of communication. Examples of such adverse effects include interference and noise that may be caused by a variety of sources including other transmissions made by other communication devices, low-quality communication links, degraded or corrupted interfaces and connectors, etc.

Present technologies do not provide adequate means to eliminate or reduce the effects of such interference and noise that can adversely affect communications between communication devices in communication systems. As such adverse effects may be effectively reduced or even eliminated, a greater amount of information may be successfully transmitted between devices within a given time.

BRIEF DESCRIPTION OF THE SEVERAL VIEWS OF THE DRAWINGS

FIG. 3A is a diagram illustrating at least one communication device operative within one or more communication systems.

FIG. 3B is a diagram illustrating an example of generation of a modulation symbol sequence using one or more bits.

FIG. 3C is a diagram illustrating another example of generation of a modulation symbol sequence using one or more bits.

FIG. 4A is a diagram illustrating an example of profile governed communications.

FIG. 4B is a diagram illustrating another example of profile governed communications.

FIG. 5A is a diagram illustrating an example of orthogonal frequency division multiplexing (OFDM) and/or orthogonal frequency division multiple access (OFDMA).

FIG. 5B is a diagram illustrating another example of OFDM and/or OFDMA.

FIG. 5C is a diagram illustrating another example of OFDM and/or OFDMA.

FIG. 6A is a diagram illustrating an example of convolutional interleaving and deinterleaving.

FIG. 6B is a diagram illustrating an example of interleaving and deinterleaving of OFDM and/or OFDMA symbols.

FIG. 8A is a diagram illustrating another example of time and/or frequency interleaving using an interleaver depth of 4 and 4 channels to generate OFDM or OFDMA symbols.

FIG. 8B is a diagram illustrating an example of channel processing using 4 channels for time and/or frequency interleaving to generate OFDM or OFDMA symbols.

FIG. 9A is a diagram illustrating an embodiment of a method for execution by one or more communication devices.

FIG. 9B is a diagram illustrating another embodiment of a method for execution by one or more communication devices.

FIG. 10A is a diagram illustrating another embodiment of a method for execution by one or more communication devices.

FIG. 10B is a diagram illustrating another embodiment of a method for execution by one or more communication devices.

DETAILED DESCRIPTION

Figure 1:
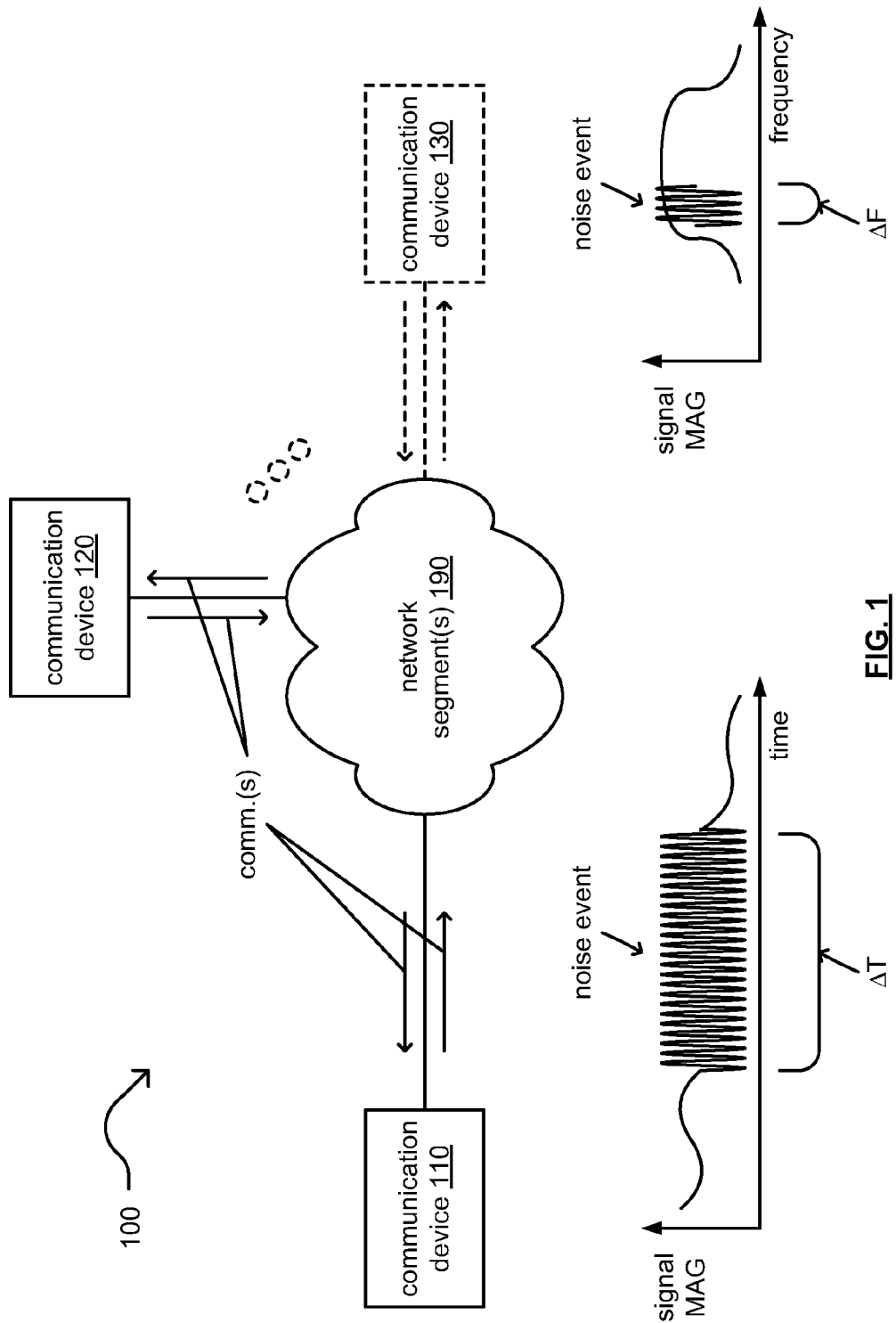
FIG. 1 is a diagram illustrating an embodiment of one or more communication systems.

FIG. 1 is a diagram illustrating an embodiment 100 of one or more communication systems. One or more network segments 190 provide communication inter-connectivity for at least two communication devices 110 and 120. Generally speaking, any desired number of communication devices are included within one or more communication systems (e.g., as shown by communication device 130). Some or all the various communication devices 110-130 include capability to operate to perform processing of modulation symbols to generate orthogonal frequency division multiplexing (OFDM) and/or orthogonal frequency division multiple access (OFDMA) symbols. As described below, OFDMA is related to and is a multi-user version of OFDM.

The various communication links within the one or more network segments 190 may be implemented using any of a variety of communication media including communication links implemented as wireless, wired, optical (including fiber-optic), satellite, microwave, etc. communication links. Also, in some instances, communication links of different types may cooperatively form a connection pathway between any two communication devices. Considering one possible example, a communication pathway between devices 110 and 120 may include some segments of wired communication links and other segments of optical communication links. Note also that the devices 110-130 may be of a variety of types of devices including stationary devices, mobile devices, portable devices, etc. and may support communications for any of a number of services or service flows including data, telephony, television, Internet, media, synchronization, etc.

When device 110 is in communication with device 120, one or more the communication links between devices 110 and 120 may be adversely affected by one or more noise sources (e.g., interference, background noise, burst noise, impulse noise, additive white Gaussian noise (AWGN), etc.). Communications adversely affected by noise may experience a reduction in signal quality or even a loss of one or more portions of one or more signals transmitted between the communication devices 110 and 120. A device receiving such communications may have difficulty or inability to process the communications properly to recover information therein. As shown at the bottom left and bottom right of the diagram, a signal may be adversely affected by a noise event such that the signal is degraded or lost over a period of time ($\Delta T$) or over a range of frequency ($\Delta F$). The noise event may occur only over a particular period of time and/or may be localized and frequency such that only a certain one or more sub-carriers are deleteriously affected. Note also that noise events may affect more than one period of time (e.g., $\Delta T1$, $\Delta T2$, and so on) and/or affect more than one range of frequency (e.g., $\Delta F1$, $\Delta F2$, and so on).

In an example of operation, device 110 includes a communication interface to support communications with one or more of the other devices 120-130. This communication may be bidirectional/to and from the one or more of the other devices 120-130 or unidirectional (or primarily unidirectional) from the one or more of the other devices 120-130.

Device 110 includes a processor configured to process or more bits to generate a modulation symbol sequence based on one or more profiles that specify variable bit loading of bits per symbol over at least some of the modulation symbols. Any one or more considerations may be used for profile selection. For example, a profile may be selected based on one or more characteristics of a communication pathway between device 110 and device 120 and/or 130. Examples of such characteristics may include signal to noise ratio (SNR), signal to interference noise ratio (SINR), noise, interference, maximum and/or minimum supported bit or symbol rate, prior, current, and/or future expected operational history of the communication pathway, the type of communication media of the pathway (e.g., wired, wireless, optical, and/or combination thereof), etc. and/or other characteristics. The processor of device 110 may also be configured to interleave the modulation symbol sequence to generate one or more OFDM symbols. An OFDM symbol includes some modulation symbols in adjacently located sub-carriers that are separated by an interleaver depth within the modulation symbol sequence and also includes some modulation symbols in adjacently located sub-carriers that are separated by more than the interleaver depth and less than twice the interleaver depth within the modulation symbol sequence. Device 110 generates the one or more OFDM symbols such that there some of the adjacently located sub-carriers include modulation symbols from the modulation symbol sequence that are separated by the interleaver depth and other of the adjacently located sub-carriers include modulation symbols from the modulation symbol sequence that are separated by a different (e.g., greater) distance within the modulation symbol sequence. Device 110 may perform time and/or frequency interleaving of the modulation symbol sequence to generate the one or more OFDM symbols. Note also that a receiving device, such as device 120, may perform time and/or frequency deinterleaving of one or more OFDM symbols received from a transmitting device, such as device 110. Device 110 may also perform time and/or frequency deinterleaving of one or more OFDM symbols received from device 120.

Figure 2:
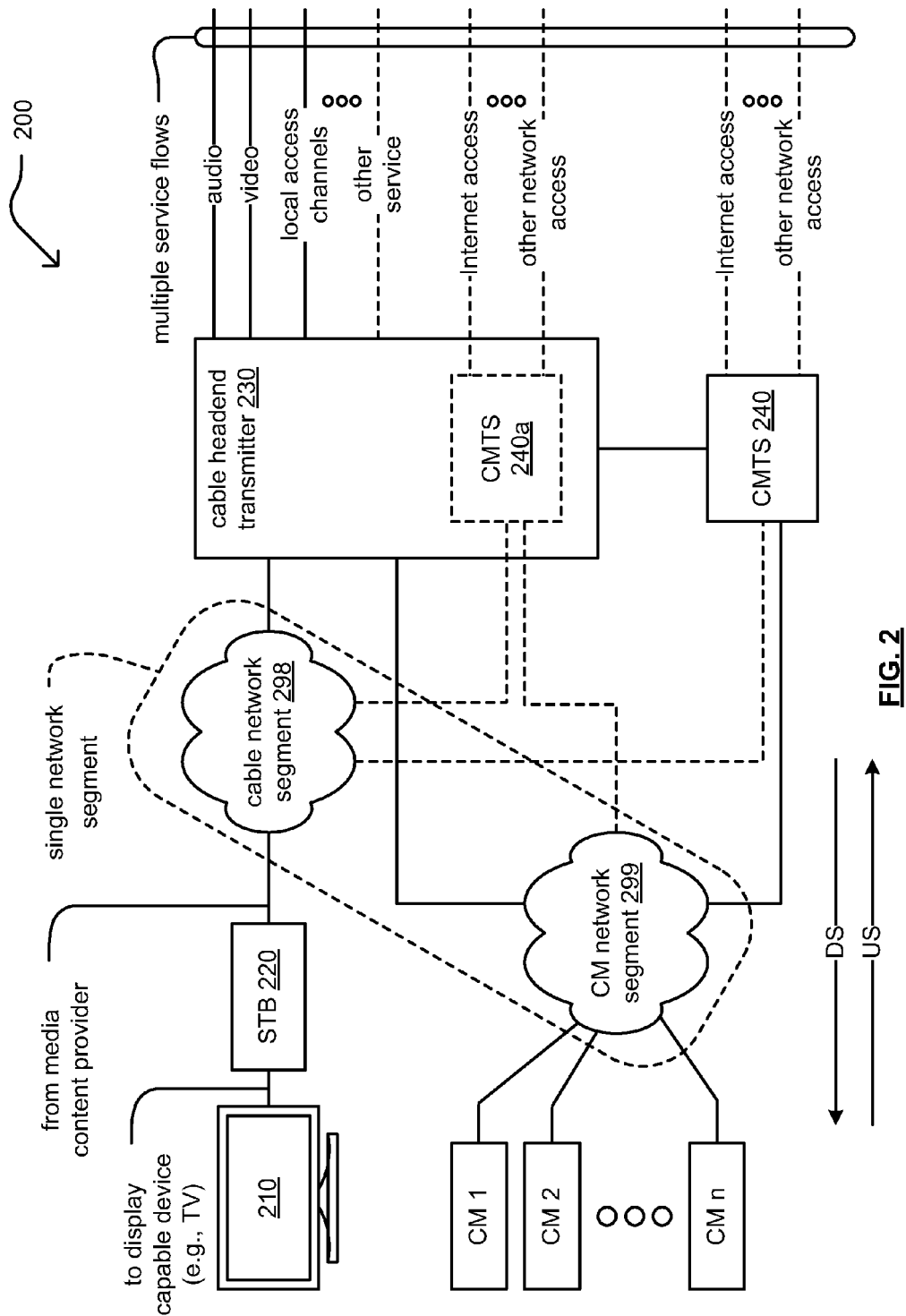
FIG. 2 is a diagram illustrating another embodiment of one or more communication systems.

FIG. 2 is a diagram illustrating another embodiment 200 of one or more communication systems. A cable headend transmitter 230 provides service to a set-top box (STB) 220 via cable network segment 298. The STB 220 provides output to a display capable device 210. The cable headend transmitter 230 can support any of a number of service flows such as audio, video, local access channels, as well as any other service of cable systems. For example, the cable headend transmitter 230 can provide media (e.g., video and/or audio) to the display capable device.

The cable headend transmitter 230 may provide operation of a cable modem termination system (CMTS) 240a. For example, the cable headend transmitter 230 may perform such CMTS functionality, or a CMTS may be implemented separately from the cable headend transmitter 230 (e.g., as shown by reference numeral 240). The CMTS 240 can provide network service (e.g., Internet, other network access, etc.) to any number of cable modems (shown as CM 1, CM 2, and up to CM n) via a cable modem (CM) network segment 299. The cable network segment 298 and the CM network segment 299 may be part of a common network or common networks. The cable modem network segment 299 couples the cable modems 1-n to the CMTS (shown as 240 or 240a). Such a cable system (e.g., cable network segment 298 and/or CM network segment 299) may generally be referred to as a cable plant and may be implemented, at least in part, as a hybrid fiber-coaxial (HFC) network (e.g., including various wired and/or optical fiber communication segments, light sources, light or photo detection complements, etc.).

A CMTS 240 (or 240a) is a component that exchanges digital signals with cable modems 1-n on the cable modem network segment 299. Each of the cable modems is coupled to the cable modem network segment 299, and a number of elements may be included within the cable modem network segment 299. For example, routers, splitters, couplers, relays, and amplifiers may be contained within the cable modem network segment 299. Generally speaking, downstream information may be viewed as that which flows from the CMTS 240 to the connected cable modems (e.g., CM 1, CM2, etc.), and upstream information as that which flows from the cable modems to the CMTS 240.

Any of the various communication devices within the embodiment 200 may be configured to include a processor configured to process or more bits to generate a modulation symbol sequence based on one or more profiles that specify variable bit loading of bits per symbol over at least some of the modulation symbols. Any of the various communication devices within the embodiment 200 may also be configured to include a processor that operates on a modulation symbol sequence to generate one or more OFDM symbols. The modulation symbols within adjacently located sub-carriers of an OFDM symbol are separated by an interleaver depth or more than an interleaver depth within the modulation symbol sequence. As an example, the modulation symbol sequence includes first and second modulation symbols that are separated by the interleaver depth and third and fourth modulation symbols that are separated by more than the interleaver depth and less than twice the interleaver depth. In an OFDM symbol, the first and second modulation symbols as well as the third and fourth mileage and symbols are transmitted via adjacently located sub-carriers, and the third and fourth modulation symbols are also transmitted via adjacently located sub-carriers. In one implementation, the first and second modulation symbols as well as the third and fourth mileage and symbols are transmitted via first adjacently located sub-carriers (e.g., first and second sub-carriers), and the third and fourth modulation symbols are transmitted via second adjacently located sub-carriers (e.g., third and fourth sub-carriers). Any of the various communication devices within the embodiment 200 may be configured to include a processor to perform time and/or frequency interleaving and/or deinterleaving to generate one or more OFDM symbols for transmission and/or process one or more received OFDM symbols.

FIG. 3A is a diagram 301 illustrating at least one communication device 110 operative within one or more communication systems. The device 110 includes a communication interface 320 and a processor 330. The communication interface 320 includes functionality of a transmitter 322 and the receiver 324 to support communications with one or more other devices within a communication system (e.g., communication device 120). The device 110 may also include memory 340 to store information including signals and/or information generated by the device 110 or other signals and/or information received from other devices via one or more communication channels. Memory 340 may also include and store various operational instructions for use by the processor 330 in regards to performing time and/or frequency interleaving and/or deinterleaving to generate and process OFDM symbols.

The communication interface 320 is configured to support communications to and from one or more other devices (e.g., communication device 120). When a signal is transmitted between devices 110 and 120, any number of noise sources may adversely affect that signal. Such noise may be caused by any one or more of interference, background noise, burst noise, impulse noise, additive white Gaussian noise (AWGN), etc. In an OFDM based communication system, there may be certain types of noise whose locations in frequency may be identified. Also, there may be certain types of noise that occur only at particular times more or for particular time durations. Device 110 may be configured to perform time and/or frequency interleaving and/or deinterleaving to generate and process OFDM symbols to reduce the adverse effects of such noise events. When several successive modulation symbols or sub-carriers of a signal are adversely affected by noise during transmission via a communication pathway, a receiving device may have difficulty or be unable to perform demodulation and/or decoding of that signal. Interleaving can reduce the likelihood that a significant number of contiguous modulation symbols or sub-carriers are adversely affected during transmission via a noise-affected communication pathway.

The processor 330 may be configured to process or more bits to generate a modulation symbol sequence based on one or more profiles that specify variable bit loading of bits per symbol over at least some of the modulation symbols. A profile may include one or more operational parameters for use in supporting communications between devices. Examples of such operational parameters may include modulation coding set (MCS) (e.g., quadrature amplitude modulation (QAM), 8 phase shift keying (PSK), 16 quadrature amplitude modulation (QAM), 32 amplitude and phase shift keying (APSK), and/or different types of MCS, etc.), forward error correction (FEC) and/or error correction code (ECC) (e.g., turbo code, convolutional code, turbo trellis coded modulation (TTCM), low density parity check (LDPC) code, Reed-Solomon (RS) code, BCH (Bose and Ray-Chaudhuri, and Hocquenghem) code, etc.)), a number of bits per symbol, a number of bits per symbol per sub-carrier, sub-carrier mapping, interleaving parameters (such as interleaver depth, number of sub-carriers, sub-carrier interleaving, etc.), etc.

Note also that a communication device as described herein may be implemented to support multi-profile communications adaptively based on one or more considerations. For example, a device may operate using a first mode at one time, and the device may operate using a second mode at a second time. Also, a device may operate using a first profile at one time, and the device may operate using a second profile the second time. The device may adapt and switch between operational modes, profiles, etc. based on one or more considerations that may include local considerations, communication pathway considerations, remote considerations, etc. For example, a device may select profile for communications to a recipient device based on prior, current, or future expected operational history of one or more of the device, the recipient device, the communication pathway between the devices, etc. As one or more operational conditions change, the device may select another profile for communication to the recipient device. The device may perform such adaptation in response to a change of an operational condition (e.g., when such a change is detected or occurs). Alternatively, the device may perform such adaptation at certain times when status of one or more operational conditions is checked, and also when a change of such an operational condition is detected.

As shown and described with reference to FIG. 1, a signal may be adversely-affected by noise over one or more durations of time and/or one or more frequency ranges. A transmitting device, such as device 110, may be configured to process modulation symbols (e.g., a modulation symbol sequence) using time and/or frequency interleaving to generate an OFDM symbol to be transmitted to a receiving device, such as device 120. Such time and/or frequency interleaving can reduce, mitigate, and/or eliminate adverse effects on successive modulation symbols within the modulation symbol sequence. Certain modulation symbols from the modulation symbol sequence, which are included within adjacently located sub-carriers of an OFDM symbol, are separated by an interleaver depth, and other modulation symbols from the modulation symbol sequence, which are included within adjacently located sub-carriers of the OFDM symbol, are separated by more than the interleaver depth and less than twice the interleaver depth. Different modulation symbols that are transmitted via adjacently located sub-carriers of the OFDM symbol may be separated by different amounts within the modulation symbol sequence (e.g., the interleaver depth or more than the interleaver depth and less than twice the interleaver depth).

The processor 330 may be configured to receive a modulation symbol sequence that includes first, second, third, and fourth modulation symbols. The first and second modulation symbols are separated by an interleaver depth within the modulation symbol sequence, and the third and fourth modulation symbols are separated by more than the interleaver depth and less than twice the interleaver depth within the modulation symbol sequence. Note that the first and second modulation symbols are not necessarily successive symbols within the modulation symbol sequence, and the third and fourth modulation symbols are not necessarily successive symbols within the modulation symbol sequence. The processor 330 may also be configured to interleave the modulation symbol sequence to generate an OFDM symbol that includes the first modulation symbol within a first sub-carrier, the second modulation symbol within a second sub-carrier that is located adjacently to the first sub-carrier, the third modulation symbol within a third sub-carrier, and the fourth modulation symbol within a fourth sub-carrier that is located adjacently to the third sub-carrier. The OFDM symbol includes some modulation symbols from the modulation symbol sequence within adjacently located sub-carriers that are separated by the interleaver depth and other modulation symbols from the modulation symbol sequence within adjacently located sub-carriers that are separated by more than the interleaver depth and less than twice the interleaver depth.

Note also that processor 330 may be configured to generate the modulation symbol sequence. For example, processor 330 may be configured perform grouping of bits into symbol labels, symbol mapping of the symbol labels to one or more modulations (e.g., a modulation including a number of constellation points each having a unique bit or symbol label). Also, note that the processor 330 may be configured to perform encoding of one or more bits to generate one or more coded bits used to generate the modulation symbol sequence. For example, the processor 330 may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, etc.

Note also that the processor 330 may be configured to perform interleaving and/or deinterleaving adaptively based on the number of considerations. The processor 330 may be configured to adapt and switch between different operational parameters used for interleaving and/or deinterleaving based on one or more considerations that may include local considerations, communication pathway considerations, remote considerations, etc. For example, a device may select a first one or more operational parameters for interleaving of communications to a recipient device based on prior, current, or future expected operational history of one or more of the device, the recipient device, the communication pathway between the devices, etc. As one or more operational conditions change, such as determined based on monitoring, comparison, etc., the processor 330 may select second one or more operational parameters for interleaving of communications for communication to a recipient device. The device may perform such adaptation in response to a change of an operational condition (e.g., when such a change is detected or occurs). Alternatively, the device may perform such adaptation at certain times when status of one or more operational conditions is checked, and also when a change of such an operational condition is detected.

FIG. 3B is a diagram illustrating an example 302 of generation of a modulation symbol sequence using one or more bits. The processor 330 of device 110 may be configured to generate a modulation symbol sequence 360 using one or more bits and/or one or more bits sequences composed of 1s and 0s, as shown by reference numeral 350. The processor may before encoding (e.g., using an ECC and/or FEC) and symbol mapping (e.g., using one or more modulation coding techniques) to generate the modulation symbols of the modulation symbol sequence 360. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

The modulation symbol sequence 360 includes first and second modulation symbols (shown as modulation symbol 1 and X) that are separated by an interleaver depth, and the modulation symbol sequence 360 also includes third and fourth modulation symbols (shows as modulation symbols Y and Z+1) that are separated by more than the interleaver depth and less than twice the interleaver depth. Modulation symbol 1 gets included within a first sub-carrier of an OFDM symbol, and modulation symbol X gets included within a second sub-carrier of the OFDM that is adjacently located to the first sub-carrier. Modulation symbol Y gets included within a third sub-carrier of the OFDM symbol, and modulation symbol Z+1 gets included within a fourth sub-carrier of the OFDM that is adjacently located to the third sub-carrier.

The different modulation symbols within the modulation symbol sequence 360 have variable bit loading of bits per symbol over at least some of the modulation symbols therein. For example, a first modulation symbol within the modulation sequence may have a first number of bits, and a second modulation symbol within the modulation sequence may have a second number of bits. In general, the modulation symbol sequence 360 may include modulation symbols having different numbers of bits per symbol. The allocation of bit loading among the modulation symbols may be profile based. For example, a first profile may specify that all modulation symbols within modulation symbol sequence 360 will have a same number of bits per symbol. A second profile may specify that a first subset of the modulation symbols within modulation symbol sequence 360 will have a first number of bits per symbol and a second subset of the modulation symbols within modulation symbol sequence 360 will have a second number of bits per symbol.

When the modulation symbol sequence 360 includes two or more subsets of modulation symbols having different numbers of bits per symbol, a profile may also specify whether or not those subsets of modulation symbols are contiguous (e.g., modulation symbols 1 through X each having a first number of bits per symbol, and modulation symbols X+1 through the end of the modulation symbol sequence 360 having a second number of bits per symbol) or noncontiguous such that modulation symbols having different numbers of bits per symbol are interspersed and intermingled among the modulation symbol sequence. In general, any desired number of different subsets or subsequences of modulation symbols having variable bit loading of bits per symbol may be included within modulation symbol sequence 360.

Also, the modulation symbols may be associated with one or more modulations (e.g., a modulation includes a constellation with a particular mapping of the constellation points therein such that each constellation point has a unique symbol label). As an example, modulation symbol 1 may include a first number of bits per symbol and be associated with a first modulation, and modulation symbol 2 may include a second number of bits per symbol and be associated with a second modulation. The modulation symbol sequence may be composed of modulation symbols having different numbers of bits per symbol, being associated with different modulations.

FIG. 3C is a diagram illustrating another example 303 of generation of a modulation symbol sequence using one or more bits. In example 303, modulation symbol sequence 360 includes first and second modulation symbols (shown as modulation symbol 1 and X) that are separated by an interleaver depth, and the modulation symbol sequence 360 also includes a third modulation symbol (shows as modulation symbols Y) that is separated by more than the interleaver depth and less than twice the interleaver depth from the second modulation symbol, X. Modulation symbol 1 gets included within a first sub-carrier of an OFDM symbol, and modulation symbol X gets included within a second sub-carrier of the OFDM that is adjacently located to the first sub-carrier. Then, modulation symbol Y gets included within a third sub-carrier of the OFDM symbol that is adjacently located to the second sub-carrier.

FIG. 4A is a diagram illustrating an example 401 of profile governed communications. Device 110 supports communications with device 120 using a profile 1 that is based on one or more characteristics associated with a pathway 1 between device 110 and 120 at or during a first time, T1. In some instances, device 110 also supports communications with device 130 using a profile 2 that is based on one or more characteristics associated with a pathway 2 between device 110 and 130 at or during the first time, T1.

FIG. 4B is a diagram illustrating another example 402 of profile governed communications. This diagram shows the same devices 110, 120, up to 130 shown within FIG. 4A but at a different, second time, T2. Device 110 supports communications with device 120 using a profile 3 that is based on one or more characteristics associated with a pathway 1 between device 110 and 120 at or during the second time, T2. Note that communications between device 110 and 120 are made using different profiles at different times. Device 110 also supports communications with device 130 using the profile 2 that is based on one or more characteristics associated with a pathway 2 between device 110 and 130 at or during the second time, T2. Note that communications between device 110 and 130 are made using a same or common profile at different times. Device 110 may be implemented to support multi-profile communications with one or more recipient devices, such as device 120 and 30 adaptively based on one or more considerations. For example, device 110 may operate using a first mode at one time, and the device may operate using a second mode at a second time.

FIG. 5A is a diagram illustrating an example 501 of orthogonal frequency division multiplexing (OFDM) and/or orthogonal frequency division multiple access (OFDMA). OFDM's modulation may be viewed a dividing up an available spectrum into a plurality of narrowband sub-carriers (e.g., relatively lower data rate carriers). Typically, the frequency responses of these sub-carriers are overlapping and orthogonal. Each sub-carrier may be modulated using any of a variety of modulation coding techniques (e.g., as shown by the vertical axis of modulated data) such as described above with respect to FIG. 3B.

FIG. 5B is a diagram illustrating another example 502 of OFDM and/or OFDMA. A transmitting device transmits modulation symbols of via the sub-carriers. OFDM and/or OFDMA modulation may operate by performing simultaneous transmission of a large number of narrowband carriers (or multi-tones). A guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a CP (Cyclic Prefix) and/or cyclic suffix (CS) that may be a copy of the CP may also be employed within the guard interval to allow switching time, such as when jumping to a new communication channel or sub-channel, and to help maintain orthogonality of the OFDM and/or OFDMA symbols. Generally speaking, an OFDM and/or OFDMA system design is based on the expected delay spread within the communication system (e.g., the expected delay spread of the communication channel).

Noise events may affect one or more ranges of frequency (e.g., $\Delta F1$, $\Delta F2$, and so on). These one or more ranges of frequency that are affected by noise may sometimes unfortunately correspond to one or more sub-carriers within an OFDM symbol (e.g., as depicted by noise affected SCs/tones within the diagram). Time and/or frequency interleaving can reduce the likelihood that successive modulation symbols within a modulation symbol sequence are included within adjacently located sub-carriers of an OFDM symbol. As such, when two or more adjacently located sub-carriers of an OFDM symbol are adversely affected by noise, there is little, if any, likelihood that successive modulation symbols within the modulation symbol sequence will be adversely affected as well.

FIG. 5C is a diagram illustrating another example 503 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of subcarriers to individual recipient devices for users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first frame, a second assignment for second frame, etc.). An OFDMA frame may include more than one OFDM symbol. Similarly, an OFDMA frame may include more than one OFDMA symbol. In addition, such sub-carrier/tone assignment may be dynamic among different respective symbols within a given (e.g., a first assignment for a first OFDMA symbol within a frame, a second assignment for a second OFDMA symbol within the frame, etc.). Generally speaking, and OFDMA symbol is a particular type of OFDM symbol, and general reference to OFDM symbol herein includes both OFDM and OFDMA symbols.

FIG. 6A is a diagram illustrating an example 601 of convolutional interleaving and deinterleaving. Modulation symbols are input to the convolutional interleaver ($\pi$) 610 on the left hand side of the diagram. A first modulation symbol is passed directly out to a communication channel, a second modulation symbol undergoes a delay of a value of Y and is then passed to the communication channel. This processing continues so that each successive modulation symbol is delayed by increasing amounts of time.

Analogously, a convolutional deinterleaver ($\pi^{-1}$) 620 is implemented at the other end of the communication channel as shown on the right hand side of the diagram. The convolutional deinterleaver ($\pi^{-1}$) 620 performs the complementary processing of the convolutional interleaver ($\pi$) 610.

A noise event within the communication channel can adversely affect modulation symbols of various codewords. Interleaving and/or deinterleaving can operate to perform appropriate shifting within a transmitter communication device and/or a receiver communication device. Interleaving and deinterleaving can reduce the likelihood that a significant number of contiguous modulation symbols are adversely affected during transmission via a noise-affected communication pathway.

FIG. 6B is a diagram illustrating an example 602 of interleaving and deinterleaving of OFDM or OFDMA symbols. Modulation symbols are input to an interleaver ($\pi$) 660 on the left hand side of the diagram to generate one or more OFDM symbols that are transmitted via a communication channel to deinterleaver ($\pi^{-1}$) 670 as shown on the right hand side of the diagram.

Interleaving may be performed such that instead of outputting one modulation symbol (e.g., based on binary phase shift keying (BPSK) symbols, quadrature amplitude modulation (QAM) symbol, 8-phase shift keying (PSK) symbols, 16 QAM symbols, etc.) at a time, a number of modulation symbols may be output at the same time, simultaneously, or in parallel. For example, a number of modulation symbols (e.g., BPSK, QAM, 16 QAM modulation symbols, etc.) may be output at the same time on sub-carriers of one or more OFDM symbols. One or more modulation symbols may be transmitted via the one or more sub-carriers of used for OFDM signaling. A device may be configured to include a processor that performs interleaving of modulation symbols, such as within a modulation symbol sequence, to generate one or more OFDM symbols for transmission via one or more communication channels.

Such an interleaving and/or de interleaving structure may be implemented using any desired number of rows or channels. The number of channels or rows corresponds to the interleaver depth used to generate the one or more OFDM symbols. Also, the channelized structure used to perform interleaving of a modulation symbol sequence provides that some modulation symbols from the modulation symbol sequence within adjacently located sub-carriers that are separated by the interleaver depth and other modulation symbols from the modulation symbol sequence within adjacently located sub-carriers that are separated by more than the interleaver depth and less than twice the interleaver depth.

When comparing the processing performed within example 602 to the processing performed within example 601, note that example 602 does not includes such a commutator in the interleaver or deinterleaver that performs a similar function as in the convolutional interleaver ($\pi$) 610 or convolutional deinterleaver ($\pi^{-1}$) 620. Instead, instead of outputting a single symbol at a time, all of a number of symbols (e.g., 128 symbols in one implementation) may all be output at the simultaneously or at the same time such that they are all transmitted in parallel, and such that each respective modulation symbol has its own frequency sub-carrier or tone.

Figures 7A, 7B:
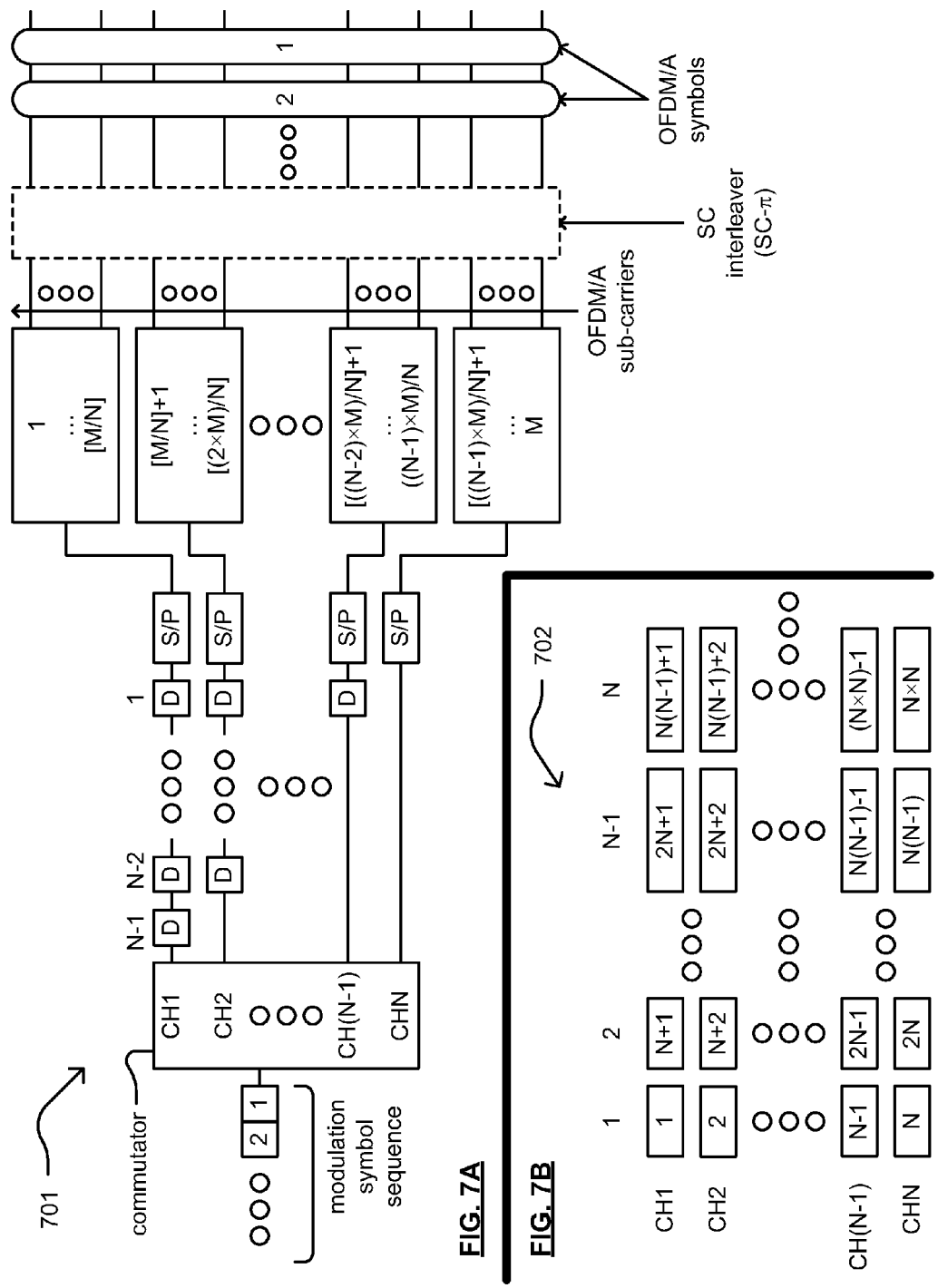
FIG. 7A is a diagram illustrating an example of time and/or frequency interleaving to generate OFDM or OFDMA symbols.
FIG. 7B is a diagram illustrating an example of channel processing for time and/or frequency interleaving to generate OFDM or OFDMA symbols.

FIG. 7A is a diagram illustrating an example 701 of time and/or frequency interleaving to generate OFDM or OFDMA symbols. A modulation symbol sequence is partitioned into a number of channels, shown as CH1, CH2, and so on up to CHN. A commutator may be implemented to arrange the modulation symbols of the modulation symbol sequence into the various channels. The bottom channel includes no delay element (e.g., bottom channel is delay-free), and the channel and adjacent to and above the bottom channel includes one delay element. Excluding the bottom channel, each of the other channels includes one more delay element than the channel and adjacent to and below it. Excluding the bottom channel and the channel adjacent to and above the bottom channel, two or more delay elements are concatenated within a given channel. The top channel includes relatively the most delay elements, and the number corresponding to one less than the interleaver depth (N) used to generate the OFDM symbols.

Each channel may also be implemented to include a corresponding serial to parallel (S/P) converter to convert the modulation symbols received serially via that channel into parallel format for placement into one or more sub-carriers of an OFDM symbol (e.g., this implementation includes M sub-carriers for transmission of OFDM symbols). For example, sub-carriers 1 to M/N are used for transmission of modulation symbols received via the top channel. Sub-carriers [M/N]+1 to [(2×M)/N] are used for transmission of modulation symbols received via the channel that is adjacent to and below the top channel. The M sub-carriers are partitioned according to the diagram such that the sub-carriers [((N−1)×M)/N]+1 to M are used for transmission of modulation symbols received via the bottom channel.

An OFDM symbol includes certain modulation symbols from the modulation symbol sequence. For example, first and second modulation symbols that are separated by an interleaver depth within the modulation symbol sequence are included within adjacently located sub-carriers within the OFDM symbol. Also, third and fourth modulation symbols that are separated by more than the interleaver depth and less than twice the interleaver depth within the modulation symbol sequence are included with adjacently located sub-carriers within the OFDM symbol. Note that the first and second modulation symbols are not necessarily successive symbols within the modulation symbol sequence, and the third and fourth modulation symbols are not necessarily successive symbols within the modulation symbol sequence. Also, the first and second modulation symbols that are separated by an interleaver depth may be transmitted via first adjacently located sub-carriers (e.g., first and second adjacently located sub-carriers), and the third and fourth modulation symbols that are separated by more than the interleaver depth and less than twice the interleaver depth may be transmitted via second adjacently located sub-carriers (e.g., third and fourth adjacently located sub-carriers that are different than the first and second adjacently located sub-carriers).

In certain implementations, When an OFDM symbol is generated using this interleaving, some of the modulation symbols among at least some of the sub-carriers of the OFDM symbol may be further interleaved to generate an interleaved OFDM symbol. For example, sub-carrier interleaving (as shown by SC interleaver (SC-$\pi$) in the diagram) may be performed on any desired number of the sub-carriers. After an OFDM symbol is firstly generated, the sub-carrier assignment of at least some of the modulation symbols with in the OFDM symbol may be further interleaved to generate an interleaved OFDM symbol. As an example, the modulation symbols of a first sub-carrier may instead be transmitted via a second sub-carrier after having undergone sub-carrier interleaving. In some instances, modulation symbols within one or more of the sub-carriers do not undergo interleaving. In such implementations, a modulation symbol sequence may undergo interleaving firstly performed to generate an OFDM symbol, and then the sub-carrier assignment within the OFDM symbol may be modified by additional interleaving of at least some modulation symbols among at least some sub-carriers of the OFDM symbol.

FIG. 7B is a diagram illustrating an example 702 of channel processing for time and/or frequency interleaving to generate OFDM or OFDMA symbols. This diagram shows the partitioning of the modulation symbols from the modulation sequence into the N channels. In FIG. 7A, a modulation symbol sequence is shown as including modulation symbols 1, 2, and so on. In FIG. 7B, modulation symbol 1 is partitioned into CH1, modulation symbol 2 is partitioned into CH2, and so on until modulation symbol N−1 is partitioned into CH(N−1), and modulation symbol N is partitioned into CHN. Then, after having reached the total number of channels that corresponds to the interleaver depth, N, modulation symbol N+1 is partitioned into CH1, modulation symbol N+2 is partitioned into CH2, and so on. Note that the number of sub-carriers of an OFDM modulation symbol, M, may be viewed as corresponding to the product of N×(N−1) (e.g., N(N−1)).

FIG. 8A is a diagram illustrating another example 801 of time and/or frequency interleaving using an interleaver depth of 4 and 4 channels to generate OFDM or OFDMA symbols. This example 801 employs an interleaver depth of 4 and 12 sub-carriers for transmission of an OFDM symbol (e.g., N=4 and M=12). A modulation symbol sequence is partitioned into 4 channels. The bottom channel is delay-free, and the top channel includes 3 concatenated delay elements (e.g., include N−1 delay elements, where N=3). The modulation symbol sequence, shown as including modulation symbol 1, 2, and so on up to modulation symbols 47, 48, and so on, undergoes processing to generate OFDM symbols.

The modulation symbol sequence includes first and second modulation symbols (shown as modulation symbol 1 and 5) that are separated by an interleaver depth, and the modulation symbol sequence also includes third and fourth modulation symbols (shown as modulation symbols 9 and 14) that are separated by more than the interleaver depth and less than twice the interleaver depth. Considering an example, OFDM symbol #4 includes modulation symbol 1 from the modulation symbol sequence within sub-carrier 12, modulation symbol 5 from the modulation symbol sequence within sub-carrier 11, modulation symbol 9 from the modulation symbol sequence within sub-carrier 10, and modulation symbol 14 from the modulation symbol sequence within sub-carrier 9. Modulation symbol 1 gets included within a first sub-carrier of OFDM symbol #4 (sub-carrier 12), and modulation symbol 5 gets included within a second sub-carrier of the OFDM #4 that is adjacently located to the first sub-carrier (sub-carrier 11). Modulation symbol 9 gets included within a third sub-carrier of the OFDM #4 symbol (sub-carrier 10), and modulation symbol 14 gets included within a fourth sub-carrier of the OFDM that is adjacently located to the third sub-carrier (sub-carrier 9). Note that modulation symbols 1 and 5 are separated by the interleaver depth, 4, and are included within adjacently located sub-carriers 12 and 11. Note also that modulation symbols 9 and 14 from the modulation symbol sequence are separated by more than the interleaver depth and less than twice the interleaver depth (e.g., they are separated by 5 within the modulation symbol sequence) and are included with adjacently located sub-carriers 9 and 8. Also, note that modulation symbols 14 and 18 are separated by the interleaver depth, 4, and are included within adjacently located sub-carriers 9 and 8. Note also that modulation symbols 22 and 27 are separated by more than the interleaver depth, 5, and are included within adjacently located sub-carriers 7 and 6.

Considering another example, symbol #3 includes modulation symbol 2 from the modulation symbol sequence within sub-carrier 9, modulation symbol 6 from the modulation symbol sequence within sub-carrier 8, modulation symbol 10 from the modulation symbol sequence within sub-carrier 7, and modulation symbol 15 from the modulation symbol sequence within sub-carrier 6. Note that modulation symbols 2 and 6 are separated by the interleaver depth, 4, and are included within adjacently located sub-carriers 9 and 8. Note also that modulation symbols 10 and 15 from the modulation symbol sequence are separated by more than the interleaver depth and less than twice the interleaver depth (e.g., they are separated by 5 within the modulation symbol sequence) and are included with adjacently located sub-carriers 7 and 6. Also, note that modulation symbols 15 and 19 are separated by the interleaver depth, 4, and are included within adjacently located sub-carriers 6 and 5. Note also that modulation symbols 19 and 23 are separated by more than the interleaver depth, 5, and are included within adjacently located sub-carriers 5 and 4.

The channelization structure employed to interleave the modulation symbol sequence to generate an OFDM symbol provides that some of the modulation symbols of the modulation symbol sequence that are separated by the interleaver depth are included within adjacently located sub-carriers, while other of the modulation symbols of the modulation symbol sequence that are separated by more than the interleaver depth are also included with adjacently located sub-carriers. Modulation symbols that are separated by more than the interleaver depth are included within adjacently located sub-carriers of an OFDM symbol. Across the entirety of an OFDM symbol, modulation symbols within adjacently located sub-carriers are separated by the interleaver depth or more than the interleaver depth.

FIG. 8B is a diagram illustrating an example 802 of channel processing using 4 channels for time and/or frequency interleaving to generate OFDM or OFDMA symbols. This diagram shows the partitioning of the modulation symbols from the modulation sequence into the 4 channels. In FIG. 8A, a modulation symbol sequence is shown as including modulation symbols 1, 2, and so on up to modulation symbols 47, 48, and so on. In FIG. 8B, modulation symbol 1 is partitioned into the top channel, modulation symbol 2 is partitioned into the channel adjacent to and below the top channel, modulation symbol 3 is partitioned into the channel adjacent to and above the bottom channel, and modulation symbol 4 is partitioned into the bottom channel. This process continues with modulation symbol 5, 6, and so on.

Note that the time and/or frequency interleaving and/or deinterleaving described herein may be performed in combination with any desired implementation of variable bit loading of modulation symbols as described herein.

FIG. 9A is a diagram illustrating an embodiment of a method 901 for execution by one or more communication devices. The method 901 begins by processing one or more bits to generate a modulation symbol sequence (block 910). The modulation symbol sequence that includes first, second, third, and fourth modulation symbols, and the modulation symbol sequence includes a variable bit loading of at least some modulation symbols therein.

Within the modulation symbol sequence, first and second modulation symbols are separated by an interleaver depth, N (block 912), and third and fourth modulation symbols are separated by more than the interleaver depth, N, and less than twice the interleaver depth, 2×N (block 914).

The method 901 then continues by interleaving the modulation symbol sequence to generate an orthogonal frequency division multiplexing (OFDM) symbol (block 920). The OFDM symbols includes the first modulation symbol within a first sub-carrier, the second modulation symbol within a second sub-carrier that is located adjacently to the first sub-carrier (block 922). Also, the OFDM symbol includes the third modulation symbol within a third sub-carrier, and the fourth modulation symbol within a fourth sub-carrier that is located adjacently to the third sub-carrier (block 924). Some modulation symbols from the modulation symbol sequence that are separated by the interleaver depth are included within adjacently located sub-carriers within the OFDM symbol. Other modulation symbols from the modulation symbol sequence that are separated by the more than the interleaver depth are also included within adjacently located sub-carriers within the OFDM symbol.

The method 901 then operates by transmitting the OFDM symbol (e.g., via a communication interface of a communication device) (block 930).

FIG. 9B is a diagram illustrating another embodiment of a 902 method for execution by one or more communication devices. The method 902 begins by processing one or more bits to generate a first modulation symbol with first bit loading (e.g., that includes a first number of bits per symbol) and a second modulation symbol with second bit loading (e.g., that includes a second number of bits per symbol) (block 905). The method 902 then continuous by generating an OFDM symbol that includes the first and second modulation symbols within one or more sub-carriers (block 911). The method 902 then operates by interleaving at least some modulation symbols among at least some sub-carriers of the OFDM symbol to generate an interleaved OFDM symbol (block 921). Some or all of the modulation symbols may be interleaved among the sub-carriers of the OFDM symbol. In some instances, one or more of the modulation symbols remains within the same one or more sub-carriers after this stage of interleaving.

The method 902 then operates by transmitting the interleaved OFDM symbol (e.g., via a communication interface of a communication device) (block 931).

FIG. 10A is a diagram illustrating another embodiment of a method 1001 for execution by one or more communication devices. The method 1001 begins by selecting a first profile that specifies a first variable bit loading and/or interleaving (block 1010). The method 1001 continues by generating first one or more OFDM or OFDMA symbols using the first profile (block 1020). The first profile may specify a first interleaver depth, a first number of sub-carriers, a first bit loading, etc. The method 1001 then operates by monitoring one or more local, remote, environmental, and/or other conditions (block 1030).

When no changes of condition is detected (decision block 1040), the method 1001 ends. Alternatively, when one or more changes of one or more conditions is detected (decision block 1040), the method 1001 continues by selecting a second profile that specifies a second variable bit loading and/or interleaving (block 1050). The second profile may specify a second interleaver depth, a second number of sub-carriers, a second bit loading, etc. The method 1001 then operates by generating second one or more OFDM or OFDMA symbols using the second profile (block 1060).

FIG. 10B is a diagram illustrating another embodiment of a method 1002 for execution by one or more communication devices. The method 1002 begins by selecting a first profile that specifies a first variable bit loading and/or interleaving for communications associated with a first communication device (block 1011). The method 1002 also operates by selecting a second profile that specifies a second variable bit loading and/or interleaving for communications associated with a second communication device (block 1021).

The method 1002 continues by generating first one or more OFDM or OFDMA symbols using the first profile (block 1031). The method 1001 also operates by generating second one or more OFDM or OFDMA symbols using the second profile (block 1041).

The method 1002 then operates by transmitting the first one or more OFDM or OFDMA symbols to the first communication device (e.g., via a communication interface of a communication device) (block 1051). The method 1002 then operates by transmitting the second one or more OFDM or OFDMA symbols to the second communication device (e.g., via the communication interface of a communication device) (block 1061).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
a processor configured to:
process a plurality of bits to generate a modulation symbol sequence based on one or more profiles that specify variable bit loading of bits per symbol over at least some modulation symbols of the modulation symbol sequence, wherein the modulation sequence includes first, second, third and fourth modulation symbols, and wherein the first and second modulation symbols are separated by an interleaver depth within the modulation symbol sequence, and wherein the third and fourth modulation symbols are separated by more than the interleaver depth and less than twice the interleaver depth within the modulation symbol sequence; and
interleave the modulation symbol sequence to generate an orthogonal frequency division multiplexing (OFDM) symbol that includes the first modulation symbol within a first sub-carrier, the second modulation symbol within a second sub-carrier that is located adjacently to the first sub-carrier, the third modulation symbol within a third sub-carrier, and the fourth modulation symbol within a fourth sub-carrier that is located adjacently to the third sub-carrier; and
a communication interface configured to transmit the OFDM symbol.

2. The communication device of claim 1 further comprising:
the processor configured to interleave the modulation symbol sequence to generate the OFDM symbol as an orthogonal frequency division multiple access (OFDMA) symbol, wherein the first modulation symbol within the first sub-carrier of the OFDMA symbol includes first information for a first other communication device and the second modulation symbol within the second sub-carrier of the OFDMA symbol includes second information for a second other communication device; and
the communication interface configured to transmit the OFDMA symbol to the first and second other communication devices.

3. The communication device of claim 1 further comprising:
the processor configured to:
process the plurality of bits to generate the first modulation symbol of the modulation symbol sequence using a first profile that is based on at least one characteristic of a first communication pathway between the communication device and a first other communication device and to generate the second modulation symbol of the modulation symbol sequence using a second profile that is based on at least one characteristic of a second communication pathway between the communication device and a second other communication device; and
interleave the modulation symbol sequence to generate the OFDM symbol as an orthogonal frequency division multiple access (OFDMA) symbol; and the communication interface configured to transmit the OFDMA symbol to the first and second other communication devices.

4. The communication device of claim 1 further comprising:
the processor configured to process the plurality of bits to generate the modulation symbol sequence that includes a first one or more modulation symbols based on a first number of bits per symbol and a second one or more modulation symbols based on a second number of bits per symbol.

5. The communication device of claim 1 further comprising:
the processor configured to process the plurality of bits to generate the modulation symbol sequence that includes a first contiguous subset of the modulation symbols based on a first number of bits per symbol followed by a second contiguous subset of the modulation symbols based on a second number of bits per symbol.

6. The communication device of claim 1 further comprising:
the processor configured to interleave at least some sub-carriers of the OFDM symbol to generate an interleaved OFDM symbol that includes the first modulation symbol within a fifth sub-carrier, the second modulation symbol within a sixth sub-carrier, the third modulation symbol within a seventh sub-carrier, and the fourth modulation symbol within an eight sub-carrier; and
the communication interface configured to transmit the interleaved OFDM symbol.

7. The communication device of claim 1 further comprising:
a cable modem; and
the communication interface configured to transmit the OFDM symbol to a cable headend transmitter or a cable modem termination system (CMTS).

8. The communication device of claim 1 further comprising:
the communication interface configured to support communications within at least one of a satellite communication system, a wireless communication system, a wired communication system, a fiber-optic communication system, and a mobile communication system.

9. The communication device of claim 8 further comprising:
a cable modem; and
the communication interface configured to transmit the OFDM symbol to a cable headend transmitter or a cable modem termination system (CMTS).

10. A communication device comprising:
a processor configured to:
process a plurality of bits to generate a modulation symbol sequence based on one or more profiles that specify variable bit loading of bits per symbol over at least some modulation symbols of the modulation symbol sequence, wherein:
the modulation sequence includes a first contiguous subset of the modulation symbols based on a first number of bits per symbol followed by a second contiguous subset of the modulation symbols based on a second number of bits per symbol;
the modulation sequence includes first, second, third and fourth modulation symbols, and wherein the first and second modulation symbols are separated by an interleaver depth within the modulation symbol sequence; and the third and fourth modulation symbols are separated by more than the interleaver depth and less than twice the interleaver depth within the modulation symbol sequence; and
interleave the modulation symbol sequence to generate an orthogonal frequency division multiplexing (OFDM) symbol that includes the first modulation symbol within a first sub-carrier, the second modulation symbol within a second sub-carrier that is located adjacently to the first sub-carrier, the third modulation symbol within a third sub-carrier, and the fourth modulation symbol within a fourth sub-carrier that is located adjacently to the third sub-carrier; and
interleave at least some sub-carriers of the OFDM symbol to generate an interleaved OFDM symbol that includes the first modulation symbol within a fifth sub-carrier, the second modulation symbol within a sixth sub-carrier, the third modulation symbol within a seventh sub-carrier, and the fourth modulation symbol within an eight sub-carrier; and
a communication interface configured to transmit the OFDM symbol.

11. The communication device of claim 10 further comprising:
the processor configured to interleave the modulation symbol sequence to generate the OFDM symbol as an orthogonal frequency division multiple access (OFDMA) symbol, wherein the first modulation symbol within the first sub-carrier of the OFDMA symbol includes first information for a first other communication device and the second modulation symbol within the second sub-carrier of the OFDMA symbol includes second information for a second other communication device; and
the communication interface configured to transmit the OFDMA symbol to the first and second other communication devices.

12. The communication device of claim 10 further comprising:
the processor configured to process the plurality of bits to generate the modulation symbol sequence that includes a first one or more modulation symbols based on a first number of bits per symbol and a second one or more modulation symbols based on a second number of bits per symbol.

13. The communication device of claim 10 further comprising:
the communication interface configured to support communications within at least one of a satellite communication system, a wireless communication system, a wired communication system, a fiber-optic communication system, and a mobile communication system.

14. A method for execution by a communication device, the method comprising:
processing a plurality of bits to generate a modulation symbol sequence based on one or more profiles that specify variable bit loading of bits per symbol over at least some modulation symbols of the modulation symbol sequence, wherein the modulation sequence includes first, second, third and fourth modulation symbols, and wherein the first and second modulation symbols are separated by an interleaver depth within the modulation symbol sequence, and wherein the third and fourth modulation symbols are separated by more than the interleaver depth and less than twice the interleaver depth within the modulation symbol sequence;

interleaving the modulation symbol sequence to generate an orthogonal frequency division multiplexing (OFDM) symbol that includes the first modulation symbol within a first sub-carrier, the second modulation symbol within a second sub-carrier that is located adjacently to the first sub-carrier, the third modulation symbol within a third sub-carrier, and the fourth modulation symbol within a fourth sub-carrier that is located adjacently to the third sub-carrier; and transmitting the OFDM symbol via a communication interface of the communication device.

15. The method of claim 14 further comprising:
interleaving the modulation symbol sequence to generate the OFDM symbol as an orthogonal frequency division multiple access (OFDMA) symbol, wherein the first modulation symbol within the first sub-carrier of the OFDMA symbol includes first information for a first other communication device and the second modulation symbol within the second sub-carrier of the OFDMA symbol includes second information for a second other communication device; and
transmitting the OFDMA symbol to the first and second other communication devices.

16. The method of claim 14 further comprising:
processing the plurality of bits to generate the first modulation symbol of the modulation symbol sequence using a first profile that is based on at least one characteristic of a first communication pathway between the communication device and a first other communication device and to generate the second modulation symbol of the modulation symbol sequence using a second profile that is based on at least one characteristic of a second communication pathway between the communication device and a second other communication device;

interleaving the modulation symbol sequence to generate the OFDM symbol as an orthogonal frequency division multiple access (OFDMA) symbol; and
transmitting the OFDMA symbol to the first and second other communication devices.

17. The method of claim 14 further comprising:
processing the plurality of bits to generate the modulation symbol sequence that includes a first one or more modulation symbols based on a first number of bits per symbol and a second one or more modulation symbols based on a second number of bits per symbol.

18. The method of claim 14 further comprising:
interleaving at least some sub-carriers of the OFDM symbol to generate an interleaved OFDM symbol that includes the first modulation symbol within a fifth sub-carrier, the second modulation symbol within a sixth sub-carrier, the third modulation symbol within a seventh sub-carrier, and the fourth modulation symbol within an eight sub-carrier; and
transmitting the interleaved OFDM symbol via the communication interface of the communication device.

19. The method of claim 14, wherein the communication device is a cable modem, and further comprising:
transmitting the OFDM symbol to a cable headend transmitter or a cable modem termination system (CMTS).

20. The method of claim 14 further comprising:
operating the communication interface of the communication device to support communications within at least one of a satellite communication system, a wireless communication system, a wired communication system, a fiber-optic communication system, and a mobile communication system.

* * * * *